United States Patent [19]
Ludwig

[11] Patent Number: 5,833,293
[45] Date of Patent: Nov. 10, 1998

[54] PORTABLE GREENHOUSE ON WHEELS

[76] Inventor: Laurance D. Ludwig, 3998 E. County Rd. 950 N., Batesville, Ind. 47006

[21] Appl. No.: 676,679

[22] Filed: Jul. 10, 1996

Related U.S. Application Data

[60] Provisional application No. 60/015,205, Apr. 8, 1996.

[51] Int. Cl.⁶ .................................................. B60R 13/00
[52] U.S. Cl. ............................................ 296/21; 296/24.1
[58] Field of Search ................................ 296/21, 22, 24.1

[56] References Cited

U.S. PATENT DOCUMENTS

| | | | |
|---|---|---|---|
| 1,327,248 | 1/1920 | Moody | 296/21 |
| 1,617,940 | 2/1927 | Chase | 296/21 |
| 1,954,495 | 4/1934 | Scheifele | 296/21 |
| 2,916,293 | 12/1959 | Lang | 296/21 |
| 3,667,799 | 6/1972 | Shryock | 296/22 |
| 4,637,647 | 1/1987 | Bunting et al. | 296/24.1 |
| 5,383,703 | 1/1995 | Irvine | 296/22 |

FOREIGN PATENT DOCUMENTS

| | | | |
|---|---|---|---|
| 80139 | 4/1987 | Japan | 296/21 |
| 396452 | 8/1933 | United Kingdom | 296/21 |

*Primary Examiner*—Gary C. Hoge
*Attorney, Agent, or Firm*—Woodard, Emhardt, Naughton, Moriarty & McNett

[57] ABSTRACT

A portable greenhouse on wheels. The frame of the greenhouse is integrally welded to a conventional flatbed car trailer. The roof is covered in plexiglass or similar material in order to admit sunlight but provide shelter for the greenhouse contents. Five windows are provided across both sides of the greenhouse, each window being hinged at the top. This allows the entire side of the trailer to be opened up for access to the greenhouse contents by merely raising each of the windows. The rear section of the greenhouse is removable, such that a unitary display rack may be slid into or out of the greenhouse. The display rack includes angled shelves which place the greenhouse contents for easy viewing and access from the open windows.

20 Claims, 6 Drawing Sheets

PORTABLE GREENHOUSE ON WHEELS

This application claims the benefit of U.S. Provisional Application No. 60/015,205, filed Apr. 8, 1996.

TECHNICAL FIELD OF THE INVENTION

The present invention generally relates to greenhouse for the growing, storage and/or display of plants and/or fresh produce and, more particularly, to a portable greenhouse on wheels.

BACKGROUND OF THE INVENTION

Retailers of plants and fresh produce face several problems in the stocking and display of such items for retail sale. Foremost among these problems is the fact that such items are generally seasonal in nature, and therefore a permanent retail display space for these items may not be economically justified. Because such items (especially plants) are preferably kept in a greenhouse to provide a hospitable environment until they are sold, many retailers (such as general discount stores and grocery stores) are forced to construct temporary greenhouse facilities in their parking lots during the warm seasons. Such facilities are usually somewhat unsightly due to their temporary nature, and involve quite a bit of labor to construct. There is, therefore, a need for an easy manner for providing an efficient and attractive temporary greenhouse to a retailer for seasonal sale of plants and/or fresh produce.

A further problem is encountered by retailers of plants and/or fresh produce in that they often find it desirable to sell such items from a roadside location in an area that has no nearby retailer of such items. The roadside location is typically occupied for only a few hours per pay, and the items must be transported to the site by truck, unloaded for display, and then the unsold items must be reloaded onto the truck at the end of the day for transport back to more permanent facilities. Such a scenario presents several problems. First, the truck does not offer proper storage for such items, especially plants, as there is no sunlight or ventilation within the truck. Secondly, much labor is expended in climbing in and out of the truck to off-load the items and disassembling and storing shelves as the items are off-loaded. Thirdly, the truck is normally not available for other uses while the roadside location is occupied. Fourthly, the off-loaded items are typically not attractively displayed to the customers. Finally, there may be customers waiting at the roadside location when the truck arrives, and they must wait a considerable time longer while the truck is unloaded. There is, therefore, a further need for an easy manner to transport and display plants and/or fresh produce for retail sale at a roadside location.

The problems in the prior art are not limited to retailers of plants and/or fresh produce. Wholesalers also encounter problems in delivering such items to the retailers. When bringing a truckload of merchandise to a retailer, it is difficult for the retailer to pick and choose which merchandise he wishes to buy, and much merchandise must be off-loaded from the truck to be viewed by the retailer, then the items not selected by the retailer must be loaded back onto the truck. This is not only time-consuming and labor intensive for the wholesaler, but forces the retailer to leave his customers while selecting wholesale stock. There is, therefore, a further need for an easy manner to transport and display plants and/or fresh produce for wholesale to retailers so as to minimize the inconvenience to the retailer.

The present invention is directed toward meeting each of these needs.

SUMMARY OF THE INVENTION

The present invention relates to a portable greenhouse on wheels. The frame of the greenhouse is integrally welded to a conventional flatbed car trailer. The roof is covered in plexiglass or similar material in order to admit sunlight but provide shelter for the greenhouse contents. Five windows are provided across both sides of the greenhouse, each window being hinged at the top. This allows the entire side of the trailer to be opened up for access to the greenhouse contents by merely raising each of the windows. The rear section of the greenhouse is removable, such that a unitary display rack may be slid into or out of the greenhouse. The display rack includes angled shelves which place the greenhouse contents for easy viewing and access from the open windows.

In one form of the invention a portable greenhouse on wheels is disclosed comprising a platform; at least one wheeled axle supporting the platform; a frame structure coupled to the platform, the frame structure defining a plurality of greenhouse sides and a greenhouse roof; at least one window coupled to at least one of the greenhouse sides, wherein the window may be opened for access to an interior of the frame structure; and at least one panel affixed to the greenhouse roof and operative to admit exterior light to the interior of the frame structure.

DETAILED DESCRIPTION OF THE PREFERRED EMBODIMENT

For the purpose of promoting an understanding of the principles of the invention, reference will now be made to preferred embodiments and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention addresses each of the problems encountered in the prior art by providing a portable greenhouse on wheels in the form of a trailer which may be towed to the retail sales location and dropped, thereby freeing up the truck used to tow the trailer for other uses. Once the trailer has been positioned at the desired location, it is only necessary to raise its side windows in order to allow access to the plants and/or fresh produce which are stored on the trailer and sale of such items may begin immediately with no off-loading required. Because the trailer is constructed as a greenhouse, the plants and/or fresh produce will be maintained in peak condition while they are being displayed. The trailer also provides an attractive and convenient display for the wholesale trade, in that the trailer may be towed to the retailer's location, the windows opened, and the wholesaler may easily see all of the merchandise which the wholesaler has to offer, select the items in which he is interested, and the items may easily be off-loaded. All of this may be done in an expeditious manner which minimizes the time that the retailer has to spend transacting his business with the wholesaler. It will therefore be appreciated by those skilled in the art that the portable greenhouse on wheels of the present invention represents a significant advance over the prior art in many respects.

Figure 1:
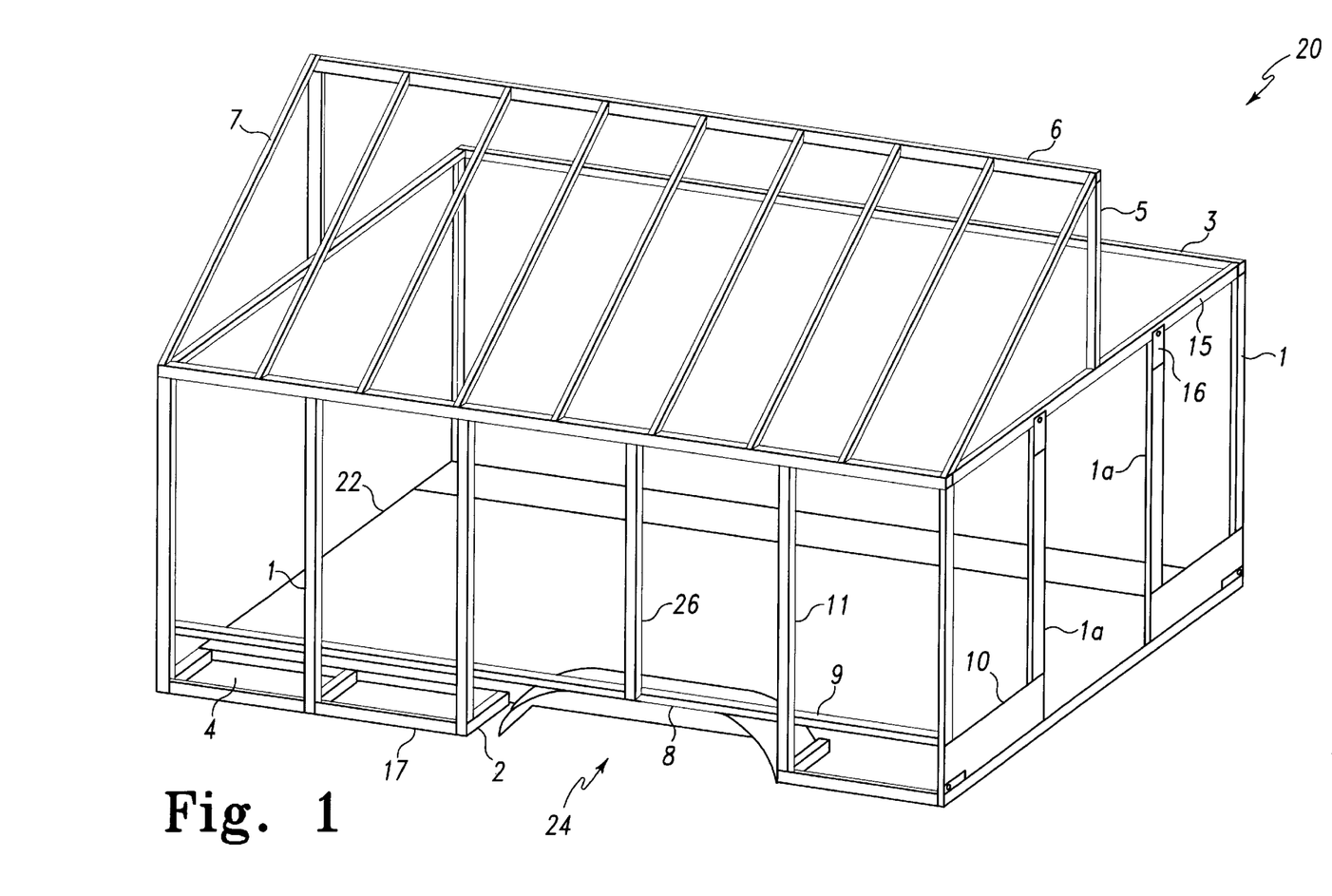
FIG. 1 is a perspective view of a frame construction of a preferred embodiment of the present invention.

Referring now to FIG. 1, there is illustrated a first embodiment portable greenhouse on wheels of the present invention, indicated generally at 20. The frame for the greenhouse is constructed upon a trailer 22, which is preferably a standard 76"×16 ft. dual axle car trailer. The framework is preferably formed from steel and is welded directly onto the frame of the trailer 22, thereby becoming an integral part of the trailer 22. The original floor of the trailer 22 extends between the wheel wells 24 on either side of the trailer, but the greenhouse frame is built to extend substantially to the outer edges of the wheel wells 24 by welding a series of floor extensions 2 to the exterior surface of the trailer 22. The floor extensions 2 preferably comprise 10 pieces of $\frac{1}{8}$" steel tubing measuring 2"×2"×10". In the areas between successive floor extension posts 2 that are not occupied by the wheel wells 24, horizontal side rails 17 are welded between the floor extension posts 2 in order to provide rigidity and a finished appearance to the exterior surface of the trailer. The inside areas bounded by the floor extension posts 2 and the side rail 17 are fitted with $\frac{1}{8}$" sheet metal 4. This assembly thus effectively extends the floor of the trailer 22 by 10" on either side.

A series of 14 vertical posts 1 (including the two posts 1A) are then welded to the ends of the floor extension posts 2 and to the floor of the trailer 22 as shown in FIG. 1. The posts 1 are preferably formed from $\frac{1}{8}$" steel tubing having dimensions of 2"×2"×72". As will be explained in greater detail hereinbelow, the two posts labeled 1A in FIG. 1 are not welded directly to the trailer 22. This facilitates the removal of the rear end of the trailer 20 for unloading and loading of display racks. Two top side rails 3 are then welded to the tops of the posts 1 on either side of the trailer 20. The top side rails 3 are preferably formed from $\frac{1}{8}$" steel tubing measuring 2"×2"×16 ft. The top of the greenhouse box is then completed by welding two top end rails 15 to the vertical posts 1 on either end of the trailer 20. The top end rails 15 are preferably formed from $\frac{1}{8}$" steel tubing measuring 2"×2"× 92".

Window and door jams 11 are then welded on either side of the vertical posts 1. The window and door jams 11 preferably comprise 28 pieces of $\frac{1}{8}$" angle iron measuring 2"×2"×60". The bottom jams 9 for the side windows are then welded between the appropriate vertical posts 1. The bottom window jams 9 preferably comprise six pieces of $\frac{1}{8}$" angle iron measuring 2"×2"×36". The bottom jams for the two windows over each wheel well 24 are formed by welding a fender well top jam 8 to the vertical posts 1 on either side of each wheel well 24. The fender well top window jams are preferably formed from $\frac{1}{4}$" angle iron measuring 2"×2"×6 ft. A vertical post 26 is then welded between the fender well top jams 8 and the side top rail 3 on either side of the trailer. One-eighth inch angle iron is then welded to either side of both of these posts 26 in order to provide the necessary jams for the windows.

In order to form the bottom window jams for the windows at the front and rear of the trailer, window jams 10 are welded between the appropriate vertical posts 1. The window jams 10 preferably comprise four pieces of $\frac{1}{8}$" angle iron measuring 2"×2"×28". The exterior side areas of the trailer 20 lying between the bottom rails 17 and the window jams 9 and 10 are covered with $\frac{1}{8}$" sheet metal.

The portable greenhouse 20 is formed such that the rear vertical posts 1A and associated framework are not welded to the remaining structure of the greenhouse 20. Instead, four rear gate latches 16 are used to bolt the rear gate assembly to the remaining portions of the greenhouse 20. The rear gate latches are preferably comprised of $\frac{1}{4}$" flat iron measuring 2"×12", with appropriate screw holes included.

In order to form the roof of the greenhouse 20, two top riser posts 5 are welded to the middle of each top end rail 15. The riser posts 5 are preferably formed from $\frac{1}{8}$" steel tubing measuring 1"×2"×22". A ridge purlin 6 is then welded between the tops of both top riser posts 5. The ridge purlin 6 is preferably formed from $\frac{1}{8}$" steel tubing measuring 1"×2"×16 ft. Eighteen rafters 7 are then welded between the ridge purlin 6 and either side rail 3. The rafters 7 are preferably formed from $\frac{1}{8}$" steel tubing measuring 1"×1"× 53", and include a 33° cut at either end in order to smoothly mate between the ridge purlin 6 and the side rails 3. A series of clear (or tinted) panels, such as plexiglass or LEXAN, are then attached to the framework of the roof, both between the rafters and on the vertical end sections, with common metal screws. There is a roof comb which extends from the front to the back of the greenhouse 20 and covers the upper portion of the roof panels, adding strength and providing added wind resistance.

Figure 2:
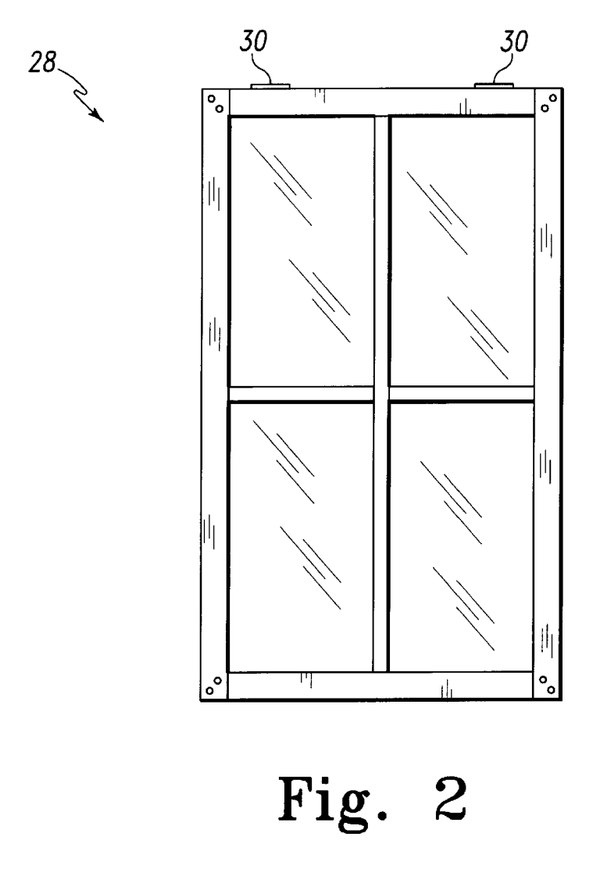
FIG. 2 is a plan view of a preferred construction of a hinged side window of the present invention.
Figure 3:
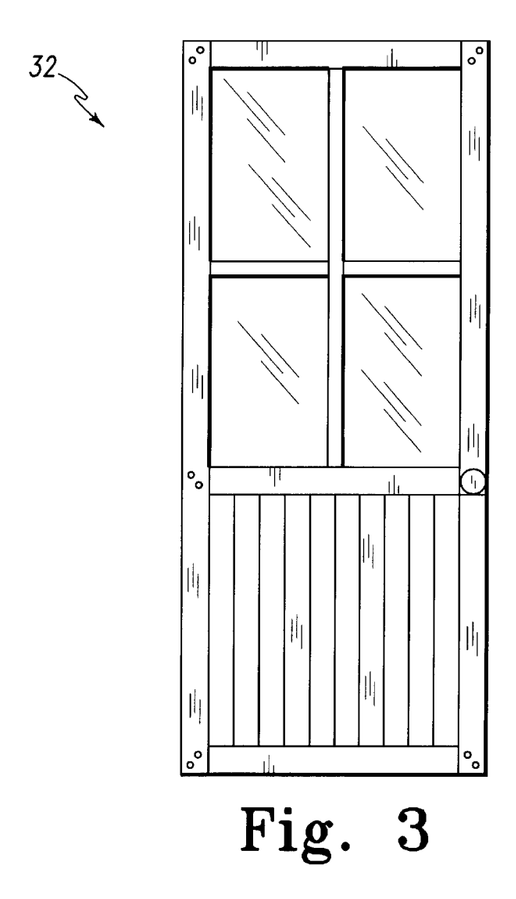
FIG. 3 is a plan view of a preferred embodiment door of the present invention.

The sides and ends of the greenhouse 20 are covered by a series of windows and doors. Each side of the greenhouse 20 contains five windows. Each of these windows is preferably formed as illustrated in FIG. 2, and indicated generally at 28. The window frames are preferably formed from 2"×4" western cedar, using lap joint corners and 1" muttons. The wooden framed windows 28 are then fitted with transparent (or tinted) panels, such as plexiglass or LEXAN. Furthermore, each of the windows 28 includes two hinges 30 on their top surface. The hinges 30 provide a mount for the windows 28 to the top side rails 3 of the greenhouse 20. Once installed, each of the windows 28 will therefore hinge from the top and may be raised to a substantially horizontal position (as described in greater detail hereinbelow) in order to display the goods within the greenhouse 20. Both the front and the rear of the greenhouse 20 include a central door 32, as illustrated in FIG. 3. The door 32 is constructed similar to the window 28, using 2"×4" western cedar with lap joint corners and 1" muttons. Additionally, the door 32 includes $\frac{1}{2}$" kick slats in the bottom of the door. A standard door handle provides convenient access through the door 32. Each door 32 is hinged to the front and rear of the greenhouse 20 in any convenient manner. On either side of the front and rear door are four more windows formed similar to the window 28 of the FIG. 2. In a preferred embodiment, however, the front and rear windows are not hinged at the top and do not open.

Figure 4:
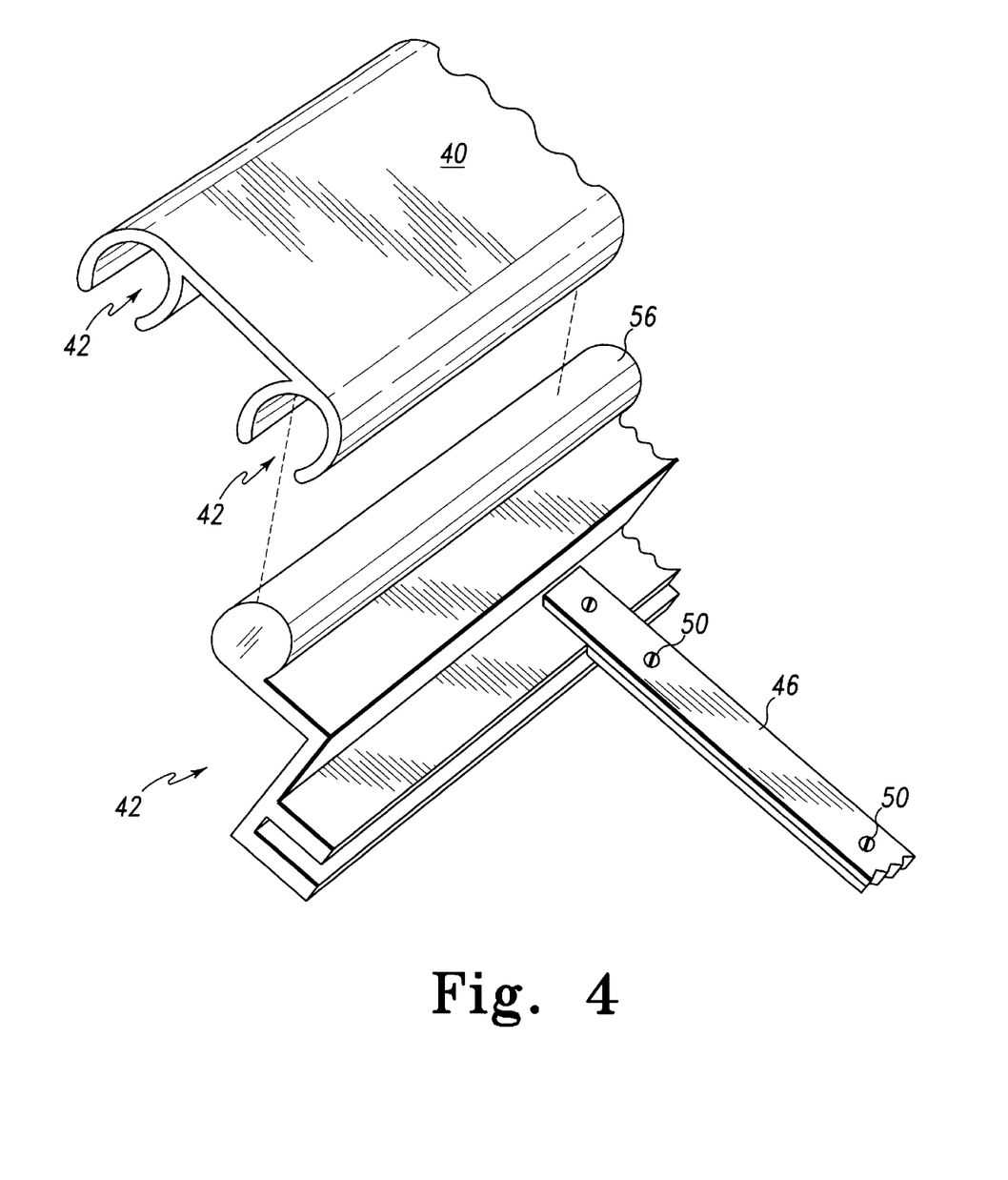
FIG. 4 is a partial perspective view of an alternative embodiment roof panel hinge system of the present invention.
Figure 5:
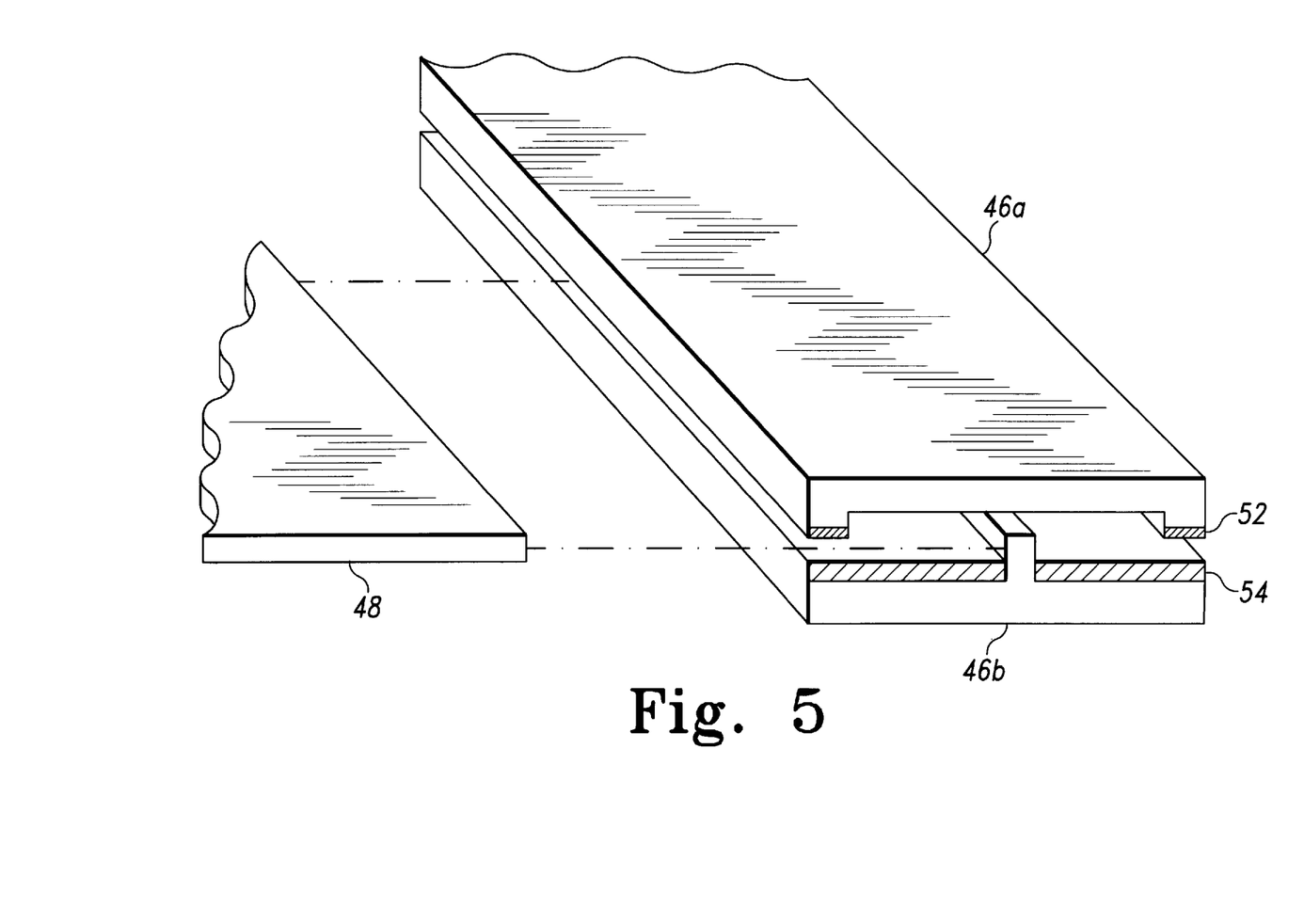
FIG. 5 is a partial exploded perspective view showing the mounting of window panels in the system of FIG. 4.

In the embodiment illustrated in FIG. 1, the top roof panels of the greenhouse 20 are fixed and do not open. This may be easily modified using the roof hinge system illustrated in FIGS. 4 and 5. The top ridge of the roof line would include a double-jointed hinge 40 extending from the front of the greenhouse 20 to the rear. The double-jointed hinge 40 is preferably formed from extruded aluminum and measures 3" wide by 16 ft. long. Each side of the hinge 40 includes a semi-cylindrical socket 42 which extends substantially the entire length of the hinge 40. Each side of the roof of the greenhouse 20 is then constructed upon a 16 ft. long purlin 44 upon which is mounted is series of rafters 46. As shown in FIG. 5, each of the rafters 46 comprises a top C-shaped section 46A and a bottom T-shaped section 46B. The adjacent plexiglass roof panel 48 is slid between the sections 46A and 46B, and they are tightened together using the screws 50. The surfaces 52 and 54 of the rafters 46A and 46B which touch the plexiglass window panels 48 are preferably covered in a soft, resilient material, such as rubber. Each of the rafters 46 is separately connected to the purlin 44. The purlin 44 includes a semi-cylindrical member 56 which runs substantially the entire length of the purlin 44, and is adapted to be received within the semi-cylindrical socket 42 of the hinge 40. In this manner, each side roof panel of the greenhouse 20 may be hinged at its top surface, thereby allowing either of the side roof panels to be raised in their entirety.

Figure 6:
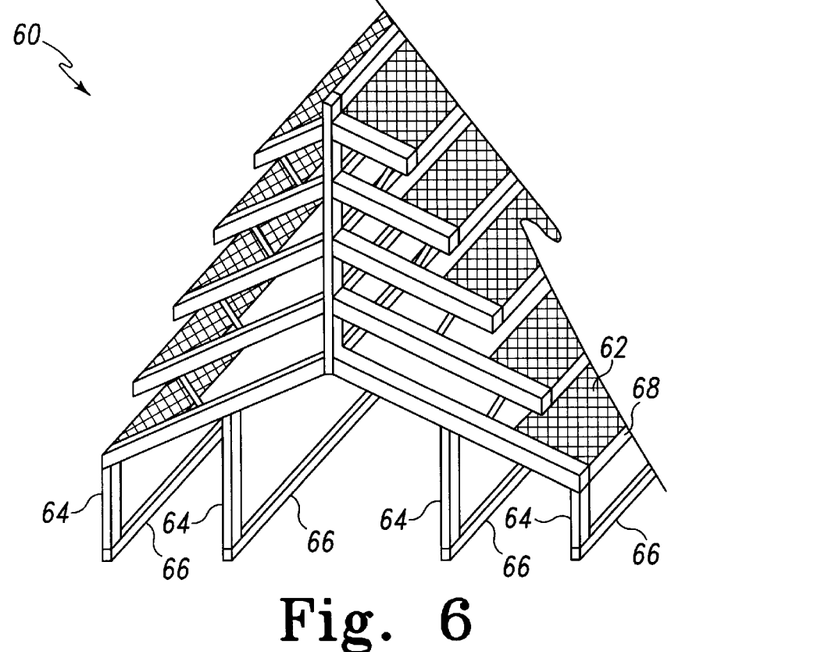
FIG. 6 is a partial perspective view of a first embodiment display rack of the present invention.

In order to display merchandise within the greenhouse 20, it is preferred that some manner of rack system be installed within the greenhouse 20 in order to provide multiple shelving layers upon which to place plants and/or fresh produce so that they are easily reachable through the open side windows. A first embodiment of such a racking system is illustrated in FIG. 6, and indicated generally at 60. As indicated in the figure, the rack 60 is formed in a tree structure, preferably from ⅛" steel tubing welded together. The lower branches of the tree are longer than the upper branches of the tree, thereby resulting in a series of shelves which are set back from one another. Each of the shelves is preferably formed from a metal wire mesh material 62 which provides support for the merchandise but which also allows water drainage therethrough. The wire mesh shelving 62 may be placed only near the outer edges of each branch of the tree (thereby maximizing storage space on the interior of the rack system) or the mesh material 62 may extend substantially to the center of the rack 60 (thereby maximizing shelf space). The feet 64 of the rack 60 are welded to a series of longitudinal rails 66 which facilitate sliding of the rack 60 into and out of the rear end of the greenhouse 20.

Therefore, the interior shelving rack 60 is a single rigid unit which preferably contains five shelves, front to back, on each side of the greenhouse 20. Each shelf 62 is tilted and set back from the one below it in order to allow full view of all items to be displayed. A lip 68 is formed on the outside edge of each of the shelves in order to prevent the displayed product from sliding off of the shelf. The shelving rack 60 may be installed or removed by removing the one piece rear gate assembly from the greenhouse 20. A forklift or a tractor with front forks can then lift and slide the rack 60 into position. It will be appreciated by those skilled in the art that there is floor storage space in the center aisle underneath the rack 60 and under each side of the shelving units. Because the shelving rack 60 is a separate piece, the rack 60 can easily be removed from the greenhouse 20 and stored, thereby allowing the full floor area of the trailer 22 to be used for various purposes. The rack 60 will hold and display, for example, 200 flats of flowers and 50 hanging floral baskets with additional storage room for 150 hanging baskets.

Figure 7:
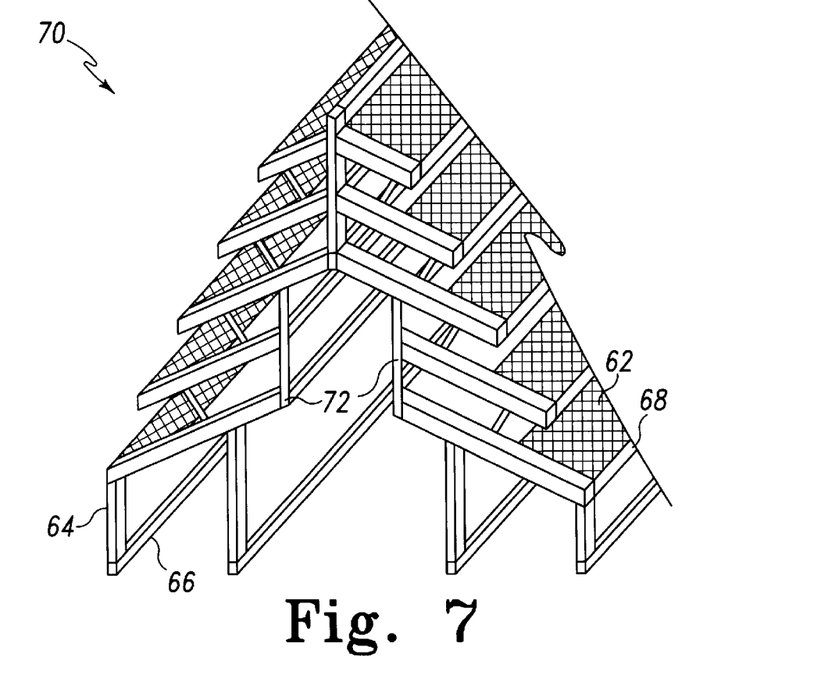
FIG. 7 is a partial perspective view of a second embodiment display rack of the present invention.

A second embodiment shelving rack is illustrated in FIG. 7, and indicated generally at 70. The rack 70 is very similar in construction to the rack 60, with the exception that the central spine of the tree structure does not extend all the way to the level of the bottom shelf. Instead, the central spine extends downward for a few shelves, and then branches out towards the sides of the rack 70 so that support for the bottom shelves is provided by bilateral spines 72. Although this structure decreases the width of the lower shelves, it provides easier access to the interior storage section of the greenhouse 20, in that headroom is provided for a normal-sized adult to crouch and walk the length of the trailer.

Figure 8:
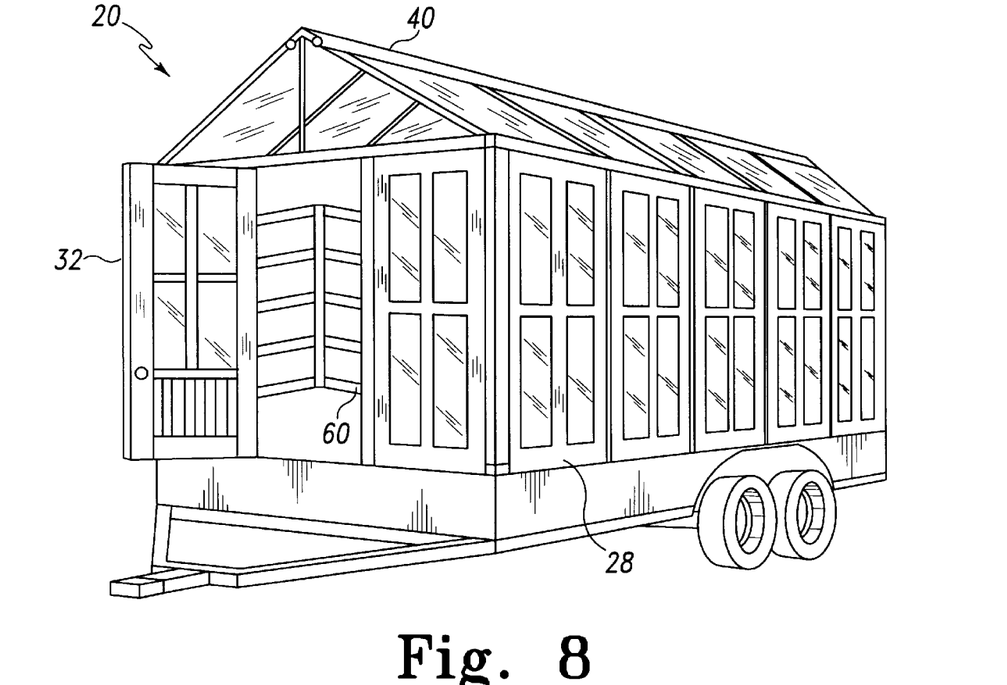
FIG. 8 is a perspective view of a preferred embodiment of the present invention.
Figure 9:
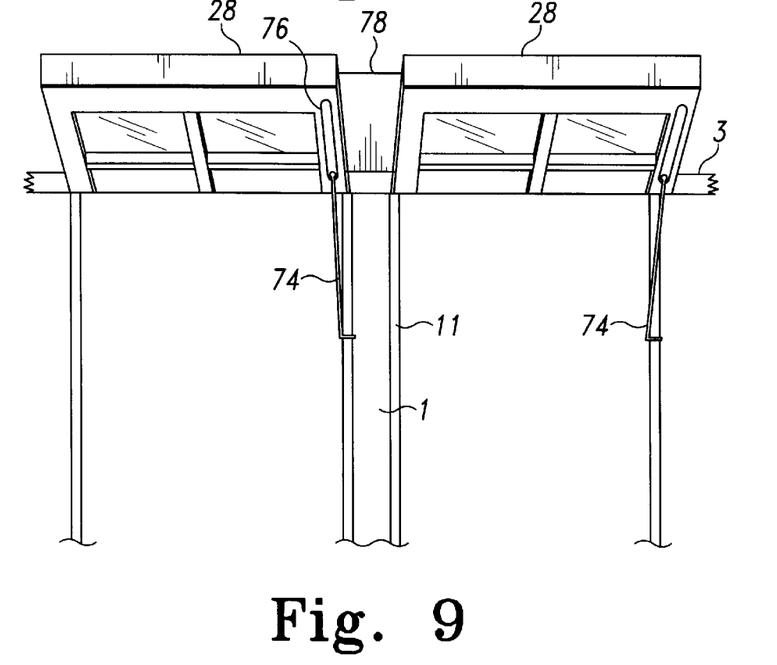
FIG. 9 is a side elevational view of two hinged windows of the present invention fixed in the up position.

The greenhouse 20 is shown fully assembled in the view of FIG. 8. In the view of FIG. 8, the side windows 28 are shown in the down (closed) position. The open position of the windows 28 is illustrated in FIG. 9. Each of the windows 28 is hinged at the top to the top side rail 3. Each of the windows 28 includes a support rod 74 which is pivotally mounted to an interior surface of the window 28 and which may releaseably engage the vertical support posts 1. When closing the window 28, the support rod 74 is disengaged from the vertical support posts 1 and folded into a receiving groove 76 cut into the frame of the window 28, and the window 28 may then be lowered to its closed position and securely latched in place. Because each window 28 preferably only includes a support rod 74 on one side thereof, sliding rods 78 may be provided on one side of each window. Once the adjacent windows have been locked in their upper position, the sliding rod 78 may be slid out of one window and into a receptacle hole formed in the side of the adjacent window, in order to provide support for the side of the adjacent window which is not supported by the vertical support rod 74.

It will be appreciated by those skilled in the art that the greenhouse 20, as a delivery system, allows a merchant to move his product line quickly and efficiently to resale locations. Each shelf is totally accessible and easily reached from outside of the greenhouse 20 at ground level, making it possible for one person to load and unload the greenhouse 20 without assistance. The greenhouse 20 does not require a lift gate or costly interior shelving that needs to be assembled, disassembled, or reassembled with each use. The greenhouse 20 allows product to be delivered to different locations without having to reload or rearrange the product after each delivery. The removable shelving racks allow for custom design interiors to display different items, such as flowers, produce, antiques, collectables, etc. No commercial driver's license is required to transport the greenhouse 20. Furthermore, the greenhouse 20 is attractive, structurally sound and durable, having a very long life expectancy.

The portable greenhouse 20 has further advantages as a mobile advertising display unit. The design of the greenhouse 20 provides total visibility of the product, allowing the product to be easily seen during transport. The attractive, colorful display (of, for example, fresh flowers) draws attention to the merchandise for sale. The portable greenhouse 20 may also be effectively used as an advertising float in merchant parades. Finally, the portable greenhouse 20 provides no cost advertising. Because all of the product is easily visible from outside of the greenhouse 20, the product advertises itself.

A further advantage offered by the portable greenhouse 20 is that, in less than five minutes, the greenhouse 20 can provide a mobile retail sales location at trade shows or at a variety of neighborhood shopping areas where local merchants wish to enhance their business and/or attract people to their establishments. The mobile greenhouse 20 can further be used in public relations/community outreach programs. The mobile greenhouse 20 is well suited for use as a portable classroom, teaching children how to plant and care for living things that will add beauty to their environment. The greenhouse field trip comes to the school, thereby eliminating the need for expensive bus transportation and staff effort in organizing an off-campus learning experience for the students. The portable greenhouse 20 can further be used to provide an "instant fund raiser" option for schools with a minimum of effort on the part of those organizations who want to earn funds to support extra-curricular activities. Further uses of the portable greenhouse 20 will be evident to those skilled in the art.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A portable greenhouse on wheels, comprising:
   a platform;
   at least one wheeled axle supporting the platform;
   a frame structure coupled to the platform, the frame structure defining a plurality of greenhouse sides and a greenhouse roof;
   at least one window coupled to at least one of the greenhouse sides, wherein the window may be opened for access to an interior of the frame structure; and
   at least one panel affixed to the greenhouse roof and operative to admit exterior light to the interior of the frame structure;
   wherein the greenhouse roof is hinged and may be opened.

2. The portable greenhouse of claim 1, wherein the at least one window provides access to the interior substantially along an entire length of at least one of the greenhouse sides.

3. The portable greenhouse of claim 2, wherein the at least one window comprises a plurality of independently operable windows.

4. The portable greenhouse of claim 2, further comprising:
   a shelving rack located within the interior of the frame structure and including a plurality of shelves substantially along the entire length of at least one of the greenhouse sides.

5. The portable greenhouse of claim 4, wherein the shelving rack is not coupled to the platform and may be slid into or out of the frame structure.

6. The portable greenhouse of claim 1, wherein the at least one panel comprises a plurality of panels covering substantially the entire greenhouse roof.

7. The portable greenhouse of claim 1, wherein the greenhouse roof is gabled.

8. The portable greenhouse of claim 4, wherein the plurality of shelves are formed at a non-zero angle to the platform and comprise a grated material which allows water drainage therethrough.

9. The portable greenhouse of claim 8, wherein each of the plurality of shelves further includes a raised lip along a lower edge thereof.

10. The portable greenhouse of claim 3, wherein each of said plurality of windows further comprises:
    a support rod pivotally coupled to the window and operable to support the window in a raised position.

11. A portable greenhouse on wheels, comprising:
    a platform;
    at least one wheeled axle supporting the platform;
    a frame structure coupled to the platform, the frame structure defining a plurality of greenhouse sides and a greenhouse roof;
    at least one window coupled to at least one of the greenhouse sides, wherein the window may be opened for access to an interior of the frame structure; and
    at least one panel affixed to the greenhouse roof and operative to admit exterior light to the interior of the frame structure;
    wherein the at least one panel comprises a plurality of panels covering substantially the entire greenhouse roof.

12. The portable greenhouse of claim 11, wherein the at least one window provides access to the interior substantially along an entire length of at least one of the greenhouse sides.

13. The portable greenhouse of claim 11, wherein the at least one window comprises a plurality of independently operable windows.

14. The portable greenhouse of claim 12, further comprising:
    a shelving rack located within the interior of the frame structure and including a plurality of shelves substantially along the entire length of at least one of the greenhouse sides.

15. The portable greenhouse of claim 14, wherein the shelving rack is not coupled to the platform and may be slid into or out of the frame structure.

16. The portable greenhouse of claim 11, wherein the greenhouse roof is hinged and may be opened.

17. The portable greenhouse of claim 11, wherein the greenhouse roof is gabled.

18. The portable greenhouse of claim 14, wherein the plurality of shelves are formed at a non-zero angle to the platform and comprise a grated material which allows water drainage therethrough.

19. The portable greenhouse of claim 18, wherein each of the plurality of shelves further includes a raised lip along a lower edge thereof.

20. The portable greenhouse of claim 13, wherein each of said plurality of windows further comprises:
    a support rod pivotally coupled to the window and operable to support the window in a raised position.

* * * * *